(12) United States Patent
Chen et al.

(10) Patent No.: US 6,521,309 B1
(45) Date of Patent: Feb. 18, 2003

(54) DOUBLE-SIDED SINGLE-LINER PRESSURE-SENSITIVE ADHESIVE TAPE

(75) Inventors: J. Samuel Chen, Lexington, MA (US); Donald Haurey, Martinsville, NJ (US)

(73) Assignee: Tyco Adhesives LP, Norwood, MA (US)

( * ) Notice: Subject to any disclaimer, the term of this patent is extended or adjusted under 35 U.S.C. 154(b) by 0 days.

(21) Appl. No.: 09/438,181

(22) Filed: Nov. 11, 1999

(51) Int. Cl.[7] .................................................. B32B 9/00
(52) U.S. Cl. ..................... 428/40.1; 428/40.6; 428/40.7; 428/41.4; 428/41.8; 428/41.9; 428/354
(58) Field of Search ............................... 428/40.1, 41.8, 428/41.9, 40.7, 40.6, 41.4, 354

(56) References Cited

U.S. PATENT DOCUMENTS

| | | | |
|---|---|---|---|
| 4,736,048 A | * | 4/1988 | Brown .................. 556/454 |
| 5,073,422 A | * | 12/1991 | Konno ..................... 428/40.1 |
| 5,372,865 A | | 12/1994 | Arakawa et al. |

FOREIGN PATENT DOCUMENTS

| WO | WO 92/12211 | 7/1992 |
|---|---|---|
| WO | WO 94/14912 | 7/1994 |

* cited by examiner

*Primary Examiner*—Nasser Ahmad
(74) *Attorney, Agent, or Firm*—Banner & Witcoff, Ltd.

(57) ABSTRACT

A double-sided single-liner pressure-sensitive adhesive tape has a first pressure-sensitive adhesive, preferably an acrylic pressure-sensitive adhesive, on one side of a carrier web, and a silicone pressure-sensitive adhesive on the other side of the carrier web. The tape is single-liner in that a double-sided release liner is wound with the double-sided tape, such that only a single release liner is required. A layer of first release material, preferably a silicone release material, is disposed on a first side of a release liner web facing the acrylic or other first pressure-sensitive adhesive. Fluorosilicone release material is disposed on the opposite surface of the release liner web facing the silicone pressure-sensitive adhesive. Preferred embodiments exhibit fluorosilicone unwind along with good balance of tack, adhesion and shear.

23 Claims, 1 Drawing Sheet

DOUBLE-SIDED SINGLE-LINER PRESSURE-SENSITIVE ADHESIVE TAPE

FIELD OF THE INVENTION

The present invention is directed to a double-sided pressure-sensitive adhesive tape and, more particularly, to a double-sided single-liner pressure-sensitive adhesive tape which employs silicone adhesive, even highly-aggressive silicone adhesive, on one side of a carrier web, and achieves good balance of tack, adhesion and shear utilizing only a single release liner.

BACKGROUND OF THE INVENTION

Double-sided pressure-sensitive adhesive tapes are known, including tapes which are wound with two release liners to achieve required ease of unwind and to avoid blocking of the tape roll. Examples include acrylic/silicone double-sided tapes, such as commercial tape product No. 9731 available from 3M Company (Minneapolis, Minn., USA) and commercial tape product No. 2178 available from John Deal Coatings, Inc. (Mount Julient, Tenn., USA) It is disadvantageous, however, to deal with two release liners when applying a double-sided tape, the second release liner adds waste and application complexity.

Also known are double-sided pressure-sensitive adhesive tapes which use one or even no release liners. As described in the background discussion in U.S. Pat. No. 5,372,865, a double-sided pressure-sensitive tape which does not use a release liner is known, in which an acrylic pressure-sensitive adhesive is used on one side and a rubber-based pressure-sensitive adhesive is used on the opposite side of the carrier web. Several draw backs for such known double-sided tapes are mentioned in that patent. Notably, the limitation of the pressure-sensitive adhesives used in such known double-sided tapes to acrylic pressure-sensitive adhesives and rubber-based pressure-sensitive adhesives is a significant disadvantage, in view of their low adhesive force and other poor performance characteristics.

It is an object of the present invention to overcome some or all of the foregoing disadvantages of known double-sided pressure-sensitive adhesive tapes. It is a particular object of at least certain preferred embodiments of the invention to provide double-sided adhesive tapes having predictable and controllable unwind force and excellent resistance to blocking. It is a further object of certain preferred embodiments to provide double-sided adhesive tapes employing only a single release liner. It is a further object of certain preferred embodiments of the invention to provide a double-sided single-liner pressure-sensitive adhesive tape, that is, a double-sided pressure-sensitive adhesive tape wound with only a single, double-sided release liner, which tape exhibits excellent adherence to silicone foam or silicone rubber or the like, silicone treated surfaces, low energy surfaces, and/or irregular surfaces, for fire and heat resistant seals.

These and additional objects and features of the invention will be understood by those skilled in the art from the following disclosure and from the discussion thereafter of certain preferred embodiments.

SUMMARY OF THE INVENTION

In accordance with a first aspect, a double-sided single-liner pressure-sensitive adhesive tape is provided, having a layer of first pressure-sensitive adhesive on a first surface of a flexible carrier web and a layer of silicone pressure-sensitive adhesive on a second surface of a carrier web. The double-sided tape is wound with a differential double-sided release liner. A layer of first release material is provided on a first surface on a flexible release liner web facing the first pressure-sensitive adhesive. A layer of fluorosilicone release material is provided on a second surface of the release liner web facing the silicone pressure-sensitive adhesive.

In accordance with another aspect, certain preferred embodiments of the invention employ highly aggressive silicone pressure-sensitive adhesive, that is, silicone PSA having high adhesive value. Especially preferred is silicone PSA having substantial phenyl content, such as polydimethyl(diphenyl)silicone PSA having about 4% to 20% phenyl content, more preferably 10% to 20% phenyl content, that is, 4% to 20% and 10% to 20% respectively, phenyl group replacement of methyl groups in the silicone polymer. Exemplary such phenyl content silicone adhesive can be prepared as the reaction product of polydimethyl (diphenyl)siloxane gums and polydisiloxane resin in accordance with known adhesives technology. It will be recognized to be a significant advantage, that a single-liner tape is thereby provided, that is, a double-sided pressure-sensitive adhesive tape employing only a single release liner, with highly adhesive silicone pressure-sensitive adhesive suitable, for example, in certain highly preferred embodiments, to form a fire and heat resistant seal to a silicone foam or silicone rubber substrate. In particular, for example, certain such preferred embodiments are found to provide adhesion to the surface of silicone foam and rubber, and to have a flame resistance rating of HF-1/HBF as measured by UL-94 test method, and temperature resistance sufficient for passing hot flex at 230° C. as measured by ASTM-0573.

In accordance with a second aspect, a double-sided single-liner pressure-sensitive adhesive tape comprises a double-sided carrier web as described above with a differential release liner, at least one side of which is coated with fluorosilicone and the opposite side of which is coated with silicone or fluorosilicone.

In accordance with another aspect, certain preferred embodiments of the invention have a layer of acrylic pressure-sensitive adhesive disposed on a first surface of a flexible carrier web, and a layer of silicone pressure-sensitive adhesive on the opposite surface of the carrier web, preferably a high adhesive value silicone PSA having phenyl group content of about 4% to 20%, more preferably having a high phenyl group content of 10% to 20%. A double-sided differential release liner has a silicone release material on a first surface of a release liner web facing the acrylic pressure-sensitive adhesive. A layer of fluorosilicone release material is coated on the second surface of the release liner web facing the silicone pressure-sensitive adhesive.

Those skilled in the art will recognize that the double-sided single-liner pressure-sensitive adhesive tapes disclosed here represent a significant technological advance. Preferred embodiments disclosed above and further discussed below are found to have excellent resistance to blocking, and to demonstrate desirable unwind forces. Certain preferred embodiments employing aggressive silicone PSA on the second surface, especially high phenyl content silicone PSA, exhibit excellent adherence to silicone foam or silicone rubber for fire and heat resistant seals. Also, certain preferred embodiments have excellent adherence to silicone treated surfaces, low energy surfaces and/or irregular surfaces, etc. More generally, preferred embodiments of the double-sided single-liner pressure-sensitive adhesive tapes disclosed here are found to provide good balance of tack, adhesion and shear. These and additional features and advantages of the present invention will be further understood from the following detailed discussed of certain preferred embodiments.

DETAILED DESCRIPTION OF CERTAIN PREFERRED EMBODIMENTS

Figure 1:
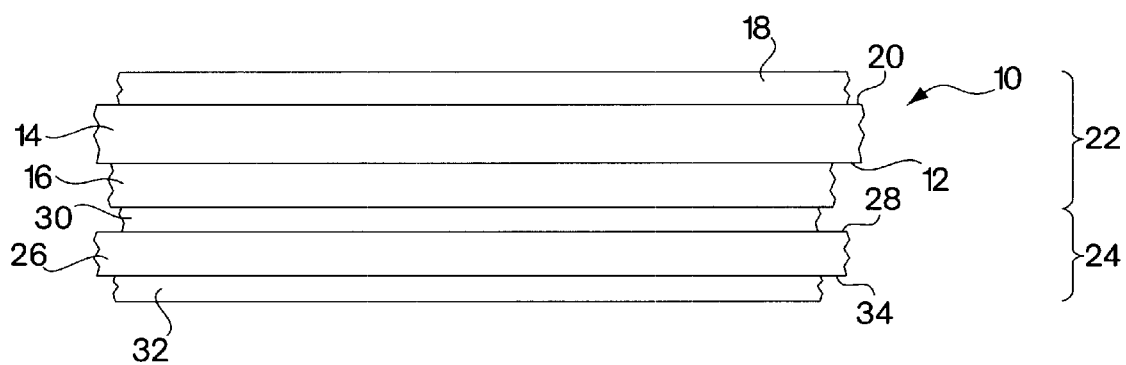
FIG. 1 is a sectional view showing one example of the double-sided single-liner pressure-sensitive adhesive tape of the present invention. It should be understood that FIG. 1 is not necessarily to scale, with certain layers of the tape construction enlarged for clarity and ease of illustration.

As disclosed above, the double-sided single-liner pressure-sensitive adhesive tapes of the present invention have silicone pressure-sensitive adhesive on one surface of a carrier web and an acrylic or other pressure-sensitive adhesive on the other side of the carrier web. The single release liner employed with such double-sided single-liner pressure-sensitive adhesive tape can provide fluorosilicone unwind. As used here, the term "fluorosilicone unwind" means that, upon unwinding the tape from the roll, the fluorosilicone release surface separates from the silicone adhesive such that the silicone adhesive is exposed, and the release liner remains adhered to the acrylic, silicone or other PSA adhesive on the opposite side of the carrier web. The tape can then be adhesively applied (i.e., at the exposed silicone adhesive side), for example, to a silicone foam to form a fire and heat resistance seal. The release liner can then be removed from the other side to expose the acrylic or other pressure-sensitive adhesive. Likewise, the term "acrylic unwind" means that an acrylic PSA adhesive is exposed in unwinding the double-sided tape from the roll and the release liner stays with the silicone adhesive side for subsequent removal. Preferably, the silicone pressure-sensitive adhesive on the second surface of the carrier web has an adhesion value to the release liner which is less than that of the other pressure-sensitive adhesive to its respective surface of the release liner, preferably at least 50% less than the adhesive value of the other PSA to the release liner.

FIG. 1 illustrates a double-sided single-liner pressure-sensitive adhesive tape 10 in accordance with a preferred embodiment of the invention. A second surface 12 of a carrier web 14 carries a pressure-sensitive adhesive 16, preferably an acrylic pressure-sensitive adhesive. A silicone pressure-sensitive adhesive 18 is carried on second surface 20 of the carrier web 14. The double-sided adhesive tape 22, as just described, is self-would with a single release liner 24 comprising a release liner web 26. First surface 28 of the release liner web 26 carries release material 30, for example, a silicone release material. A fluorosilicone release material 32 is carried on the second surface 34 of the release liner web 26. Double-sided single-liner pressure-sensitive double-sided adhesive tape 10 has been unwound from a roll of such tape (not shown). More specifically, the tape has been unwound with fluorosilicone unwind. For that reason, the silicone PSA 18 is shown to be exposed whereas release material 30 of the release liner 24 remains in place over pressure-sensitive adhesive 16. Thus, the silicone pressure-sensitive 18 is available to be adhered to a substrate, such as a silicone foam or other substrate. The release liner 24 can then be stripped from the adhesive tape 22, thereby exposing pressure-sensitive adhesive 16 to be adhered to a second substrate or rather surface. The fluorosilicone unwind is achieved by having the adhesion between the silicone release material and the acrylic or other pressure-sensitive adhesive carried on the first surface 12 of carrier web 14 be greater than the adhesion between the fluorosilicone release material 32 and the silicone adhesive 18 carried on the second surface 20 of the carrier web 14. Optionally, the pressure-sensitive adhesive 16 on the first surface 12 of carrier web 14 is silicone pressure-sensitive adhesive. In that case, the release material 30 carried on first surface 28 of release liner web 26, which faces such silicone adhesive 16, preferably is a silicone or even fluorosilicone release material. Nevertheless, the double-sided single-liner pressure-sensitive adhesive tape advantageously is provided with differential release, whereby preferably, the fluorosilicone release material 32 releases from silicone PSA 18 during unwind of the tape.

The flexible carrier web of the double-sided single-liner pressure-sensitive adhesive tapes disclosed here can be tissue paper, e.g., Reemay™ 2250 available from Reemay Company, Old Hickory, Tenn., U.S.A., or, more advantageously, is a non-woven carrier web, more specifically, a unitary solid film of suitable material such as polyester film, polyacrylic film, polypropylene film, polyethylene film, polyvinylchloride film, polyvinylidene chloride film, polyphenylene sulfide film, fluorine resin film, polyvinyl acetate film, polyamide film, polyimide film, polyetherimide film, or the like. Additional suitable materials will be readily apparent to those skilled in the art given the benefit of this disclosure, and numerous such materials are commercially available. In accordance with certain preferred embodiments, the flexible carrier web is a polyester film having a thickness of from 0.23 to 2.0 mils, for example, 0.48 mil thick polyester film available from Rhône-Poulenc Inc. (Bloomfield, N.Y., U.S.A.) under the product name Terphane®.

Preferably, the polyester film or other flexible carrier web employed in the double-sided single-liner pressure-sensitive adhesive tapes disclosed here have at least about 32 KPSI tensile strength at break, by test method PSTC-31, and at least about 130% elongation at break (MD), by test method PSTC-31.

Suitable silicone pressure-sensitive adhesives for use in the double-sided single-liner pressure-sensitive adhesive tapes disclosure here, corresponding to silicone PSA 18 described above with reference to FIG. 1 will be apparent to those skilled in the art in view of the present disclosure. As discussed above, the silicone PSA will lie against the fluorosilicone release material of the release liner when the tape is rolled. According to this highly advantageous aspect of the present invention, the silicone PSA can be extremely aggressive, that is, have extremely high adhesion values. Most preferably, the silicone PSA has an adhesion value of from 50 to 150, oz./inch, more preferably from 50 to 100 oz./inch tested using a 2 mil thick adhesive layer on a 2 mil PET backing and using test method PSTC-3. As disclosed above, certain preferred embodiments employ polydimethyl (diphenyl)silicone PSA for highly aggressive adhesion. Exemplary such silicone PSA include SILGRIP® PSA518 Silicone Pressure-sensitive Adhesive available from GE Silicones (Waterford, N.Y. USA), having 30–40 ounces/inch width peel strength and 500g/cm$^2$ minimum crystalized tack (benzoyl peroxide catalyzed and tested on 1 mil polyester film), silicone solids of 54–57%, specific gravity (25° C.) of 0.99, viscosity (at 25° C.) of 50,000–100,000 cps (Brookfield RVF, #6 spindle at 10 rpm), flash point (ASTM D43) of 12° C. and employing suitable solvent such as xylene, toluene, etc. Optionally, for enhanced cohesive strength and improved aging, reduced tape roll telescoping, etc., a crosslinking or curing agent is added to this silicone PSA, typically about 0 to 2.0% based on silicone content. Employing this adhesive with 0 to 2.0% benzoyl peroxide, for example about 0.1%, at 1.5–2.0 mil adhesive thickness on 2 mil Mylar® or 2 mil Teflon® carrier web, 180° peel adhesion values per ASTMD—1000 of 33 to 72 ounces/inch are obtained. Another highly preferred, very high adhesion value polydimethyl(diphenyl)silicone PSA is available as SILGRIP® PSA6574 Silicone Pressure-sensitive Adhesive from GE Silicones, having 70–110 ounces/inch peel adhesion and 80 g/cm$^2$ minimum tack (uncatalyzed, measured on 2 mil polyester film), silicone solids of 54–56%, specific gravity of 0.98, density of 8.3 lbs/gal., viscosity (at 25° C.) of 9,000–30,000 cps, flash point (PMCC) of 11° C., and employing suitable solvent such as toluene and VM&P naphtha. The pressure-sensitive adhesive preferably is disposed on the carrier web as a film of substantially uniform thickness in accordance with known techniques. Typically, the silicone pressure-sensitive adhesive layer has a thickness of from 1.5 to 2.5 mil, for example 2.0 mils. Suitable thickness will depend, in part, on the intended use application. Additional suitable silicone adhesives and the manner of their use will be apparent to those skilled in the art given the benefit of the present disclosure.

As used herein and in the appended claims, a silicone pressure-sensitive adhesive is any pressure-sensitive adhesive comprising at least 50% wt. % silicone adhesive based on the total weight of the adhesive formulation, such as, for example, at least 50% by weight the copolymer reaction product of polydimethylsiloxane, most preferably polydimethyl(diphenyl)siloxane gum, and polysiloxane resin. Optionally, the silicone adhesive may include additives and like ingredients, such as colorants, fillers, surfactants, etc., and as noted above, solvent and crosslinking agents or catalysts or curing agents.

The other adhesive of the double-sided tape disclosed here can be any suitable pressure-sensitive adhesive, of which many are commercially available and known to those skilled in the art, including acrylic adhesives, acrylic/rubber adhesive, rubber-based adhesive, silicone adhesives, etc. In accordance with certain preferred embodiments, the second adhesive, corresponding to adhesive 16 disposed on first surface 12 of carrier web 14 in the adhesive tape shown in FIG. 1, is an acrylic pressure-sensitive adhesive, preferably an acrylic PSA consisting essentially (other than additives, such as mentioned above) of the crosslinked copolymer of (i) ethylenically unsaturated carboxylic acid having 3–6 carbon atoms, (ii) acrylic and/or methacrylic acid ester of a non-tertiary alcohol having 1–14 carbon atoms, and (iii) vinyl acetate. Acrylic PSA employed in the double-sided single-liner PSA tapes disclosed here, in accordance with preferred embodiments, has solids content of about 52%, viscosity (25° C.) of 1,650–7,500 cps (test method: Brookfield RVT, #4@20 RPM), Polyken probe tack of at least 600 gms, and 180° peel adhesion of at least 50 ounces/inch (tested at 1 mil thickness on 2 mil polyester film carrier web using test method PSTC-1). Commercially available acrylic adhesives include, for example, Aeroset 1810-Z52, Aeroset 1910-Z52, and Aeroset 1920-Z52, all available from Ashland Chemical Company. Such adhesives typically are used in a thickness of about 1.5 to 2.5 mils, for example, 2 mils, and are coated onto the carrier web in accordance with well-known techniques. Additional suitable adhesives and their usage will be readily apparent to those skilled in the art in view of the present disclosure.

The release liner web can be formed of any suitable material, for example, paper, super-calandered kraft, glassine, clay coated paper, polyolefin coated paper and films and the like. Alternative suitable materials will be readily apparent to those skilled in the art in view of the present disclosure. A typical paper release liner web will have thickness, for example, of about 2.0 to 4.4 mils, although the thickness will be determined in large part by the intended end-use application of the tape. Preferably, the release liner web is super-calandered kraft having a thickness of about 4 mils and tensile strength of at least about 50 lbs/inch (MD).

The first surface of the release liner web has a layer of release material corresponding to release material 30 in the double-sided single-liner pressure-sensitive adhesive tape 10 of FIG. 1. Numerous suitable release materials are commercially available and will be apparent to those skilled in the art in view of the present disclosure. Preferably, such release material is a silicone release material, in view of the excellent performance characteristics and ready commercial availability of such materials. Moreover, suitable silicone release materials are commercially available, having excellent release values, shelf stability and high temperature tolerance for oven processing steps up to 315° F. in the manufacture of the tape. Such silicon release materials include solvent-based materials, water-based materials and UV cure or thermal cure solventless materials. Exemplary silicone release materials include the SL release materials available from GE Silicone, typically comprising GE SL6000 silicone-based release polymer, GE SL6030 control release additive, SS4300C crosslinker agent, and SL6010 catalyst. Another exemplary release material, commercially available from Dow Chemical Company (Midland, Mich. USA), comprises SYL-OFF 7686 base polymer plus catalyst, 7684 controlled release additive, and 7678 crosslinker. The release material is applied to the release liner web in accordance with known techniques. Selection of a suitable release material will be within the ability of those skilled in the art given the benefit of the present disclosure, and will depend, in part, upon the desired release force, the pressure adhesive chose for the tape, against which the release material will lie, and like considerations.

In accordance with a significantly advantageous aspect of the double-sided single-liner pressure-sensitive adhesive tapes disclosed here, the second surface of the release liner web has a fluorosilicone release material (corresponding to fluorosilicone release material 32 in the preferred embodiment of FIG. 1). In accordance with certain highly preferred embodiments, the fluorosilicone release material is found to provide a fluorosilicone unwind even when used with a highly aggressive silicone PSA, that is, a silicone pressure-sensitive adhesive (corresponding to silicone PSA 18 in the embodiment of FIG. 1) having an extremely high adhesion value. Suitable fluorosilicone release materials are commercially available, including, for example, SYL-OFF #7785 available from Dow Coming Company (Midland, Mich., USA), and FSR2000 available from the General Electric Company. Additional fluorosilicone release materials suitable for use in the double-sided single-liner pressure-sensitive adhesive tapes disclosed here will be apparent to those skilled in the art in view of the present disclosure. The fluorosilicone release material is applied to the carrier web in accordance with known techniques. The use of fluorosilicone release material in the double-sided single-liner PSA tapes disclosed here is found to the highly advantageous, especially in view of their effective performance even with the preferred embodiments employing highly aggressive, high phenyl content silicone adhesives discussed above.

The following example illustrates a preferred embodiment of the present invention, but is not intended to limit the scope of the invention or of the appended claims.

EXAMPLE

A double-sided single-liner pressure-sensitive adhesive tape was made having a 0.5 mil polyethylene terephthalate film carrier web with 2.0 mil Aeroset 1920-Z52 acrylic pressure-sensitive adhesive (available from Ashland Chemical) on one side and 1.8 mil PSA 6574 silicone PSA (available from GE Silicones) on the opposite surface, and a differential, double-sided release liner employing a 4 mil super-calendered kraft paper release liner web with solventless platinum-cured silicone release coating on the surface facing the acrylic PSA and fluorosilicone release coating on the surface facing the highly aggressive PSA 6574 adhesive. The tape was wound and found to have fluorosilicone unwind, as defined above. Further, it had easy liner removal from the acrylic adhesive side, along with good balance with tack, adhesion and shear. More particularly, the tape was tested and found to have the following properties. All tests used 2-mil polyethylene terephthalate film as the backing and a stainless steel panel as the substrate. That is, both sides of the tape sample strip are laminated onto 2-mil polyethylene terephthlate film and applied to stainless steel panel to conduct the test. The loop tack method was used for determining the tack value. Specifically, a strip (1 inch wide and 6 inches long) of Xerox paper was looped and allowed to contact the adhesive under its own weight. After a 1-inch by 1-inch contact area was formed, the loop was lifted and the force required for removing the loop was measured. The probe tack value was generated with Polyken probe tack tester. Rolling ball tack was measured by test method PST-6. Shear was measured by test method PSTC-7. Liner removal was measured by test method PSTC-4. Unwind force was measured by test method PSTC-8.

Unwind force (fluorosilicone unwind) of 0.8 ounces/inch as measured by PSTC-8 test method;

Peel strength of the silicone adhesive from a stainless steel panel of 90 ounces/inch, as measured by PSTC-3 test method;

Peel strength of the acrylic adhesive from a stainless steel panel of 70 ounces/inch, as measured by PSTC-3 test method;

R.T. Shear for the acrylic PSA side of 100+ hours;

R.T. Shear for the silicone PSA side of 3+ hours;

Liner removal from the acrylic PSA side of 3.2 ounces/inch; and

| | |
|---|---|
| Total Thickness | 8.3 mils |
| Adhesion Levels (Acrylic PSA) | |
| Stainless Steel | 163 oz./in |
| Enameled Steel | 146 oz./in |
| Plexiglass (PMMA) | 128 oz./in |
| PVC (Flexible) | 116 oz./in |
| Glass | 104 oz./in |
| Polycarbonate | 101 oz./in |
| Chromium Plated Steel | 73 oz./in |
| Aluminum | 64 oz./in |
| Polypropylene | 52 oz./in |
| Polyethylene | 37 oz./in |
| EPDM | 12 oz./in |
| Probe Tack (Silicone PSA) | 775 gms. |
| Probe Tack (Acrylic PSA) | 760 gms. |
| Loop Tack (Silicone PSA) | 90 oz./in |
| Loop Tack (Acrylic PSA) | 70 oz./in |
| Application Temperature | −25° to 300° F. |
| Maximum Continuous Use | 315° F. |
| Intermittent Use | 375° F. |

It will be readily apparent to those skilled in the art that modifications and additions can be made to the various embodiments described above, without departing from the true scope and spirit of the present invention, and the appended claims are intended to cover such true scope and spirit of the invention.

What is claimed is:

1. A double-sided single-liner pressure-sensitive adhesive tape comprising:
    a flexible carrier web;
    a layer of pressure-sensitive adhesive on a first surface of the carrier web;
    a layer of silicone pressure-sensitive adhesive on a second surface of the carrier web; and
    a single release liner comprising:
        a flexible release liner web;
        a layer of release material on a first surface of the release liner web facing the layer of pressure-sensitive adhesive on the first surface of the carrier web; and
        a layer of fluorosilicone release material on a second surface of the release liner web facing the layer of silicone pressure-sensitive adhesive,
    wherein the silicone pressure-sensitive adhesive on the second surface of the carrier web comprises polydimethyl(diphenyl)silicone.

2. The double-sided single-liner pressure-sensitive adhesive tape of claim 1 wherein the polydimethyl(diphenyl)silicone has from 4% to 20% phenyl content.

3. The double-sided single-liner pressure-sensitive adhesive tape of claim 1 wherein the polydimethyl(diphenyl)silicone has from 10% to 20% phenyl content.

4. The double-sided single-liner pressure-sensitive adhesive tape of claim 1 wherein the layer of pressure-sensitive adhesive on the first surface of the carrier web comprises acrylic pressure-sensitive adhesive.

5. The double-sided single-liner pressure-sensitive adhesive tape of claim 4 wherein the layer of release material on the first surface of the release liner web facing the acrylic pressure-sensitive adhesive comprises silicone release material.

6. The double-sided single-liner pressure-sensitive adhesive tape of claim 5 wherein the adhesion between the silicone release material and the acrylic pressure-sensitive adhesive is greater than the adhesion between the fluorosilicone release material on the second surface of the release liner web and the silicone adhesive on the second surface of the carrier web such that the tape has the property of fluorosilicone unwind.

7. The double-sided single-liner pressure-sensitive adhesive tape of claim 1 wherein the layer of pressure-sensitive adhesive on the first surface of the carrier web comprises silicone pressure-sensitive adhesive.

8. The double-sided single-liner pressure-sensitive adhesive tape of claim 7 wherein the release material on the first surface of the release liner web comprises silicone or fluorosilicone release material.

9. The double-sided single-liner pressure-sensitive adhesive tape of claim 8 wherein the silicone pressure-sensitive adhesive on the second surface of the carrier web has an adhesion value to the release liner at least 50% less than the adhesive value to the release liner of the silicone pressure-sensitive adhesive on the silicone surface of the carrier web.

10. A double-sided single-liner pressure-sensitive adhesive tape comprising:
 a flexible carrier web;
 a layer of acrylic pressure-sensitive adhesive on a first surface of the carrier web;
 a layer of silicone pressure-sensitive adhesive on a second surface of the carrier web; and
 a double-sided release liner comprising
  a flexible release liner web,
  a layer of silicone release material on a first surface of the release liner web facing the acrylic pressure-sensitive adhesive, and
  a layer of fluorosilicone release material on a second surface of the
 release liner web facing the silicone pressure-sensitive adhesive,
wherein the silicone pressure-sensitive adhesive on a second surface of the carrier web is selected from the group consisting of polydimethyl(diphenyl)silicone or a reaction product of polydimethyl(diphenyl)silicone gum and polydisiloxane resin.

11. The double-sided single-liner pressure-sensitive adhesive tape of claim 10 wherein the flexible carrier web is selected from the group consisting of tissue paper, nonwoven polyester film, polyacrylic film, polypropylene film, polyethylene film, polyvinylchloride film, polyvinylidene chloride film, polyphenylene sulfide film, fluorine resin film, polyvinyl acetate film, polyamide film, polyimide film, and polyetherimide film.

12. The double-sided single-liner pressure-sensitive adhesive tape of claim 10 wherein the silicone pressure-sensitive adhesive has an adhesion value of 50 to 150 ounces/inch as tested using a 2.0 mil thick layer of the silicone pressure-sensitive adhesive on a 2 mil PET backing and using test method PSTC-3.

13. The double-sided single-liner pressure-sensitive adhesive tape of claim 10 wherein the release liner web is selected from the group consisting of super-calandered kraft, glassine, clay coated paper, polyolefin coated paper and polyolefin films.

14. A double-sided single-liner pressure-sensitive adhesive tape comprising:
 a flexible carrier web;
 a layer of pressure-sensitive adhesive on a first surface of the carrier web;
 a layer of silicone pressure-sensitive adhesive on a second surface of the carrier web; and
 a flexible release liner web;
 a layer of silicone or fluorosilicone release material on a first surface of a release liner web facing the layer of pressure-sensitive adhesive on the first surface of the carrier web; and
 a layer of fluorosilicone release material on a second surface of the release liner web facing the layer of silicone pressure-sensitive adhesive,
wherein the layer of silicone pressure-sensitive adhesive on a second surface of the carrier web comprises polydimethyl(diphenyl)silicone.

15. The double-sided single-liner pressure-sensitive adhesive tape of claim 1 wherein the layer of pressure-sensitive adhesive on the first surface of the carrier web and the layer of silicone pressure-sensitive adhesive on the second surface of the carrier web are different pressure-sensitive adhesives.

16. A double-sided single-liner pressure sensitive adhesive tape comprising:
 a flexible carrier web;
 a layer of pressure-sensitive adhesive on a first surface of the carrier web;
 a layer of silicone pressure-sensitive adhesive on a second surface of the carrier web; and
 a single release liner comprising:
  a flexible release liner web;
  a layer of release material on a first surface of the release liner web facing the layer of pressure sensitive adhesive on the first surface of the carrier web; and
  a layer of fluorosilicone release material on a second surface of the release liner web facing the layer of silicone pressure-sensitive adhesive,
wherein the layer of release material on the first surface of the release liner web facing the layer of pressure-sensitive adhesive on the first surface of the carrier web and the layer of fluorosilicone release material on the second surface of the release liner web facing the layer of silicone pressure-sensitive adhesive are different release materials.

17. The double-sided single-liner pressure-sensitive adhesive tape of claim 1 wherein the level of adhesion between the layer of release material on the first surface of the release liner web and the layer of pressure-sensitive adhesive on the first surface of the carrier web is different than the level of adhesion between the layer of fluorosilicone release material on the second surface of the release liner web and the layer of silicone pressure-sensitive adhesive on the second surface of the web carrier.

18. The double-sided single-liner pressure-sensitive adhesive tape of claim 16 wherein the layer of pressure-sensitive adhesive on the first surface of the carrier web comprises acrylic pressure-sensitive adhesive.

19. The double-sided single-liner pressure-sensitive adhesive tape of claim 16 wherein the layer of silicone pressure-sensitive adhesive on the second surface of the carrier web comprises polydimethyl(diphenyl)silicone.

20. The double-sided single-liner pressure-sensitive adhesive tape of claim 18 wherein the layer of silicone pressure-sensitive adhesive on the second surface of the carrier web comprises polydimethyl(diphenyl)silicone.

21. The double-sided single-liner pressure-sensitive adhesive tape of claim 16 wherein the layer of pressure-sensitive adhesive on the first surface of the carrier web comprises silicone pressure-sensitive adhesive.

22. The double-sided single-liner pressure-sensitive adhesive tape of claim 16 wherein the flexible carrier web is selected from the group consisting of tissue paper, nonwoven polyester film, polyacrylic film, polypropylene film, polyethylene film, polyvinylchloride film, polyvinylidene chloride film, polyphenylene sulfide film, fluorine resin film, polyvinyl acetate film, polyamide film, polyimide film, and polyetherimide film.

23. The double-sided single-liner pressure-sensitive adhesive tape of claim 16 wherein the release liner web is selected from the group consisting of super-calandered kraft, glassine, clay coated paper, polyolefin coated paper and polyolefin films.

* * * * *